United States Patent

[11] 3,594,485

| [72] | Inventor | Frank Tinker |
| | | Sheffield, England |
| [21] | Appl. No. | 719,170 |
| [22] | Filed | Apr. 5, 1968 |
| [45] | Patented | July 20, 1971 |
| [73] | Assignee | Associated Electrical Industries Limited |
| | | London, England |
| [32] | Priority | Apr. 7, 1967 |
| [33] | | Great Britain |
| [31] | | 16021/67 |

[54] INGOT PRODUCTION
11 Claims, 3 Drawing Figs.

[52] U.S. Cl. .................................................. 13/13
[51] Int. Cl. .................................................. H05b 3/60
[50] Field of Search .................................... 13/14, 9,
31; 75/10, 11, 12, 13; 219/73, 126; 164/52

[56] References Cited
UNITED STATES PATENTS

| 2,654,015 | 9/1953 | Landis et al. ............... | 219/73 |
| 3,024,352 | 3/1962 | Danhier ...................... | 219/126 |
| 3,234,608 | 2/1966 | Peras .......................... | 164/52 |
| 3,139,473 | 6/1964 | Morris ......................... | 13/13 |
| 2,783,411 | 2/1957 | Matulaitis .................... | 13/9 (UX) |

FOREIGN PATENTS

| 183,847 | 9/1966 | U.S.S.R. ..................... | 13/13 |
| 979,583 | 1/1965 | Great Britain ............... | 75/10 |

*Primary Examiner*—Bernard A. Gilheany
*Assistant Examiner*—R. N. Envall, Jr.
*Attorney*—Bowyer and Witherspoon ABSTRACT: An electroslag plant for ingot production from a plurality of electrodes connectable to a common supply for contemporaneous melting is arranged for control of the progressive feeding of the electrodes during the process by a single controller responsive to electrode current. If separate mechanical arrangements are provided for supporting and progressing the electrodes individually the single controller can be arranged to be switched for controlling each of the electrodes in turn. Alternatively the several electrodes can be supported on a common feed carriage controlled by the single controller in dependence on an electrode current reference which may be either the current drawn by one electrode or the average or summation of the electrode currents.

INGOT PRODUCTION

BACKGROUND OF THE INVENTION

1. Field of the Invention

This invention relates to the so-called electroslag process of producing ingots of metal, which work is used herein as connoting not only elemental metals but also, in accordance with an important present day use of this process, metal alloys such for instance as various types of steel.

2. Description of Prior Art

In the electroslag process, at least one electrode of the metal to be formed into an ingot, or possibly of unalloyed constituents of an alloy to be produced in ingot form, is supported with its lower end depending into an ingot mould and is there immersed in a blanket of molten slag over a pool of molten metal forming a counterelectrode. The lower end of this process electrode is spaced from the surface of this molten pool and is progressively fused off to enter the pool by heat which is generated by the passage of electric current through the slag between the electrode and pool.

The electroslag process can be performed using a plurality of electrodes depending into the same ingot mould and connected either to a single-phase supply or to respective phases of a multiphase electric supply. A common arrangement involves three electrodes connected to a three-phase supply.

An important factor in the operation of the electroslag process is the depth of immersion of the electrode in the slag or, rather, the separation distance between the electrode top and the molten metal pool at the top of the ingot which, of course, is related to the electrode immersion. This factor plays a part in the determination of the temperature distribution in the slag and, more importantly, in the depth and shape of the molten metal pool at the top of the ingot upon which largely depends the final metallurgical structure of the ingot.

The electrode immersion is related to the effective cross section of the electrode, to the voltage applied to it, and to the current flowing from its tip into the slag. Thus for a given effective electrode cross section and a given applied voltage, a greater electrode immersion causes a larger current to flow. For a given applied voltage an electrode of greater effective cross section will require a smaller depth of immersion, if a given current is to be maintained, and an electrode of lesser effective cross section will require a greater depth of immersion.

By "effective cross section" is meant the cross section effective for carrying current into the slag and this factor depends not only on the geometric area of the electrode section but also on the density of the metal structure, because porosity or cavities will play a part.

For economic reasons, the electrodes are produced by casting or some other inexpensive method which cannot ordinarily be expected to provide electrodes within very close limits of effective cross section. Consequently, to afford control over this important factor of electrode immersion, it has hitherto been thought necessary, in any case of plural electrodes, to provide the several electrodes with their own supporting and progressing arrangements including respective individual controllers.

SUMMARY OF THE INVENTION

Contrary to this previous thought, the present invention provides, for electroslag ingot production from a plurality of process electrodes connectable to a common supply for contemporaneous melting, whether it be a single-phase supply or a multiphase supply to the several phases of which the electrodes are respectively connected, electroslag process plant arranged for control of the progressive feeding of the electrode during the process by a single electrical controller responsive to electrode current.

Separate mechanical arrangements for supporting and progressing the several electrodes may be provided, together with means for switching the controller automatically to each electrode in sequence so that the current drawn by each electrode is monitored and the necessary positional adjustment made, say every ten seconds. The single controller could in this way control the feed of the plurality of electrodes into a single mould: alternatively it could possibly be used to control the feed of the electrodes each into a separate mould so as to enable, for example, three single-phase ingots to be made simultaneously.

The foregoing arrangement with a switched controller can give satisfactory performance within relatively wide limits of electrode cross section and density which can be determined empirically. Alternatively, within somewhat closer limits of cross section and density the several electrodes may be supported on a common feed carriage so that simultaneous feed thereof is controlled in dependence on, and in such manner as to tend to maintain at a preselected value, a single current reference which may be the current drawn by one of the electrodes or the average or summation of the currents drawn by all the electrodes. With such an arrangement a self-compensating action results from the fact that an electrode of smaller effective cross section has less metal to be melted per unit of length and so requires less power to melt off at a given speed. The smaller effective cross section will pass less current at a given immersion depth, so that at a given applied voltage it will draw less power. The effects have been found to tend towards self compensation, within empirically determinable limits as mentioned earlier, so that electrodes of varying effective cross section can be fed into the mould on a common carriage without variation in immersion sufficient to be metallurgically objectionable. Particularly has this been found to be so in the case of three-phase operation in a single mould, in which electromagnetic rotation of the slag blanket evens out both its temperature and the effect of any differential electrode immersion on the depth and shape of the metal pool at the top of the ingot. In such a case, a satisfactory ingot has been produced from three electrodes of 4, 4½ and 5 inches diameter respectively.

It will be appreciated that, in an arrangement with a common carriage for the electrodes, there will be a considerable economy, as compared with the aforementioned known arrangements, in the provision of controllers and mechanical arrangements for supporting and progressing the electrodes. In cases where individual mechanical arrangements are provided for the several electrodes (providing more flexibility in coping with electrode variation) there will still be a useful economy in replacing one or more controllers by a single selector switch.

BRIEF DESCRIPTION OF THE DRAWINGS

Embodiments of the invention are illustrated by way of example in the accompanying somewhat schematic drawings, in which.

DESCRIPTION OF PREFERRED EMBODIMENTS

Figure 1:
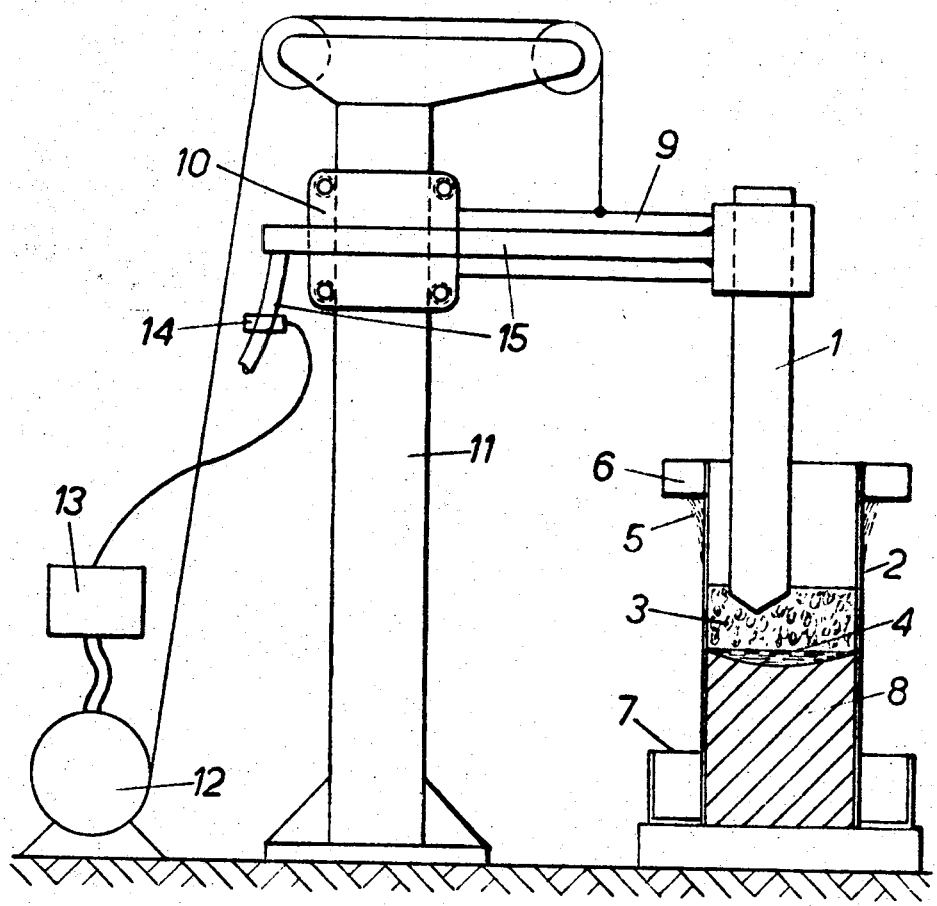
FIG. 1 is a side elevation of an electrode support and feed arrangement showing an electrode depending into an ingot mould, the latter being in cross section.

Referring to FIG. 1, an electrode 1 depends into an ingot mould 2 in which its lower end is immersed in a slag blanket 3 over a pool 4 of molten metal continuously formed as the electrode material is progressively fused off by heat generated by the passage of electric current through the slag between the electrode and the pool. The mould is cooled, preferably by a water curtain 5 flowing down the outside of its wall from an annular water duct 6 to a drainage trough 7. Because of this cooling action the molten metal fused off into the mould solidifies progressively upwards to form a solid ingot 8 which in the end is separated from the mould.

The electrode 1 is clamped at the end of a support arm 9 extending from a carriage 10 which is movable up and down a column 11 by a motor driven hoist 12. Consequently the height of the lower end of the electrode 1 in the mould, and thus its distance from the counterelectrode constituted by the molten pool 4, can be adjusted by control of the hoist 12. To this end a controller 13 is provided which appropriately controls the hoist by reacting in known manner to variations of electrode current as sensed by a current reference transformer 14 on the supply connection 15 to the electrode, the magnitude of this current being a function of the electrode distance.

Figure 2:
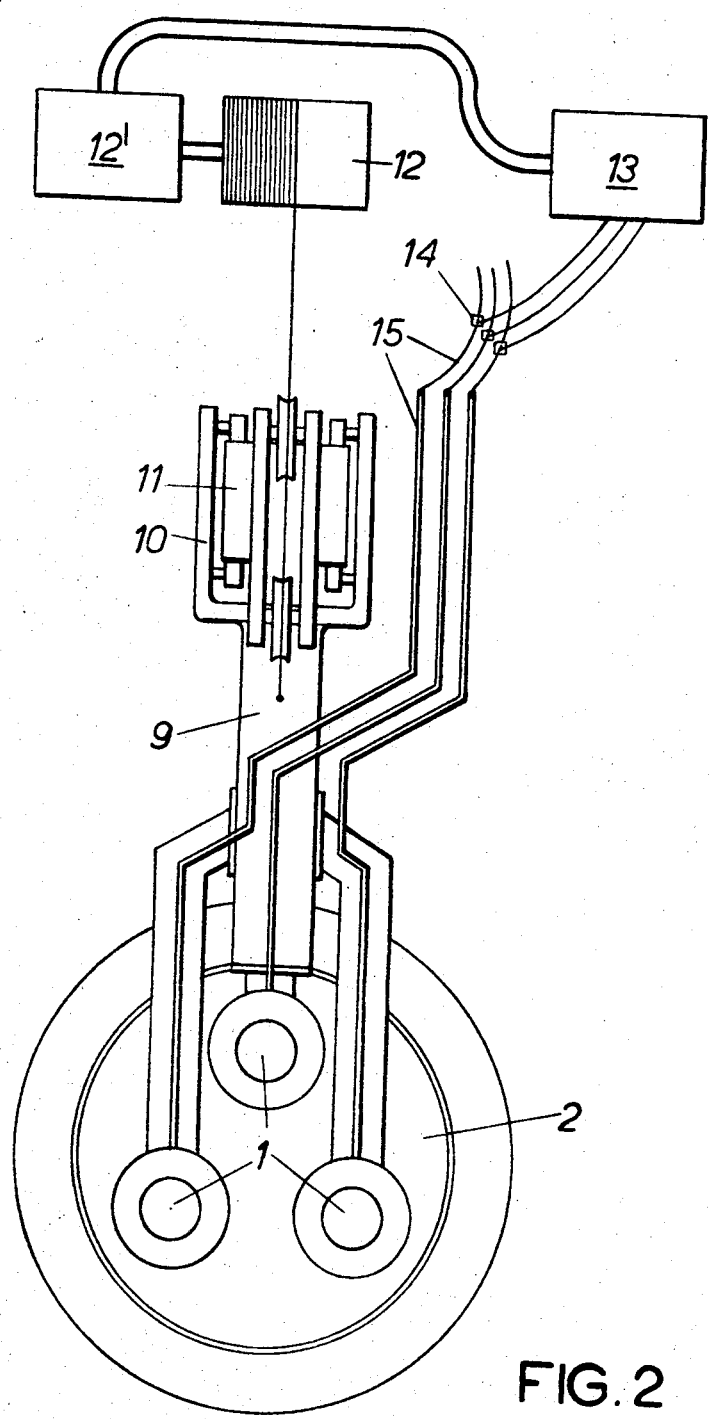
FIG. 2 is a plan view of an arrangement in accordance with the invention of three electrodes carried by a common support arm and fed into a single ingot mould under control of a single controller.

In the arrangement of FIG. 2 (in which, as in FIG. 3, parts corresponding in function to those in FIG. 1 have been given the same reference numerals), the support arm 9 extending from the carriage 10 is trifurcated and carries three electrodes 1 depending into a single ingot mould 2. The controller 13 controls the motor 12' of the hoist 12, and thereby the mechanical feed of the electrodes 1 into the mould 2, in dependence on a current reference taken either from one of the electrode connections 15 by means of the associated transformer 14, or as the average or sum of the currents sensed by transformers 14 associated individually with all of the electrode connections 15 as shown. If the electrodes are connected in parallel to a single-phase supply the electrodes should be similar in diameter and density in order to ensure proper operation of the process. With the electrodes connected to respective phases of a three-phase supply, greater differences in diameter and/or density can be tolerated (although still within limits). This is because the stirring action which accompanies three-phase operation tends to homogenize the variations that would tend to result from the use of electrodes of different diameter or density, and therefore to counteract their effect on ingot quality, due to resultant different melting rates, unequal variations of the immersion depths and/or variation in the currents of the several electrodes.

The possibility exists of using the arrangement of FIG. 2 for making three separate ingots in individual moulds into which the three electrodes individually depend. However in this case, unless steps are taken to effect some compensatory action during the process—for example by having the mould bases vertically adjustable within the moulds—it is contemplated that the mould diameters and effective cross sections of the electrodes would require to be identical to within very close limits: otherwise a heavy electrode in an undersize mould would tend to be fed into the ingot, while a lighter electrode in an oversize mould would tend to rise out of the slag.

Figure 3:
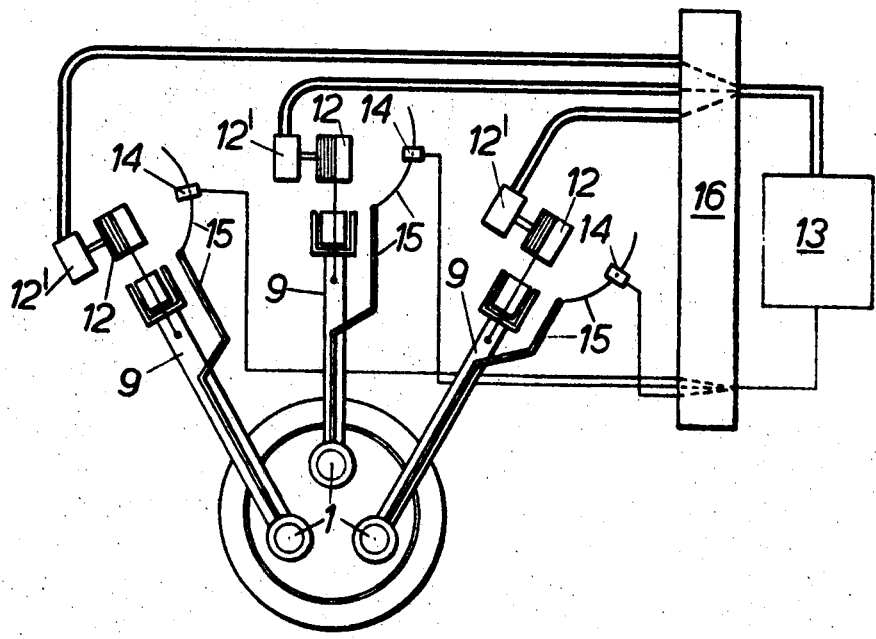
FIG. 3 is a plan view of an arrangement in accordance with the invention of three electrodes the feeds of which into a single ingot mould are individually controlled in sequence by a single controller.

In the arrangement of FIG. 3, three separate electrode support and feed mechanisms, each comprising an electrode support arm 9, carriage 10 and hoist 12, are controlled by a single controller 13 through a sequence switching arrangement 16. For each of the mechanisms in turn, the sequencer 16 connects the controller 13 to the hoist motor 12' of the mechanism concerned and to the current reference transformer 14 associated with the supply connections 15 to the electrode 1 carried by that mechanism. The controller thereupon causes any necessary adjustment of the electrode position, and is then switched to the next mechanism to make any necessary adjustment there. The electrodes 1 in FIG. 3 have been shown arranged for making a single ingot in a mould 2 but they could alternatively be arranged for making individual ingots in three separate moulds. They could be connected either in parallel to a single-phase supply or to respective phases of a three-phase supply.

I claim:
1. Electroslag apparatus comprising:
 a. an ingot mould;
 b. a plurality of consumable electrodes each having a variable, current carrying effective cross section;
 c. mechanical means for supporting said plurality of consumable electrodes with their lower ends extending into a slag blanket contained within the said mould;
 d. a source of electrical supply common to each of said consumable electrodes;
 e. electrical conductors connecting the said consumable electrodes to the said common electrical supply whereby said electrodes are contemporaneously melted;
 f. a circuit having means for sensing and monitoring the electrical current flowing between the said slag blanket and at least one of the said consumable electrodes;
 g. feeding means connected to the said consumable electrodes for progressively feeding the said electrodes into the slag blanket; and
 h. a single controller responsive to variations in the monitored current and controlling the progressive feeding of the said consumable electrodes in accordance with the said variations.

2. Electroslag apparatus as claimed in claim 1 and including a column; a carriage vertically moveably mounted on said column, a common support extending from said carriage and supporting each of said consumable electrodes, and means operable by said single controller to control the movement of said carriage.

3. Electroslag apparatus as claimed in claim 2, and wherein the said controller is responsive to variations in the current flowing between the said slag blanket and a single one of the said consumable electrodes.

4. Electroslag apparatus as claimed in claim 2, and wherein the said controller is responsive to variations in the average of the currents flowing between the said slag blanket and each of the said consumable electrodes.

5. Electroslag apparatus as claimed in claim 2, and wherein the said controller is responsive to variations in the summation of the currents flowing between the said slag blanket and each of the said consumable electrodes.

6. Electroslag apparatus as claimed in claim 1, and wherein said supporting means includes a separate column for each of said consumable electrodes, a separate carriage extending from each of said columns, each of said carriages being vertically and moveably mounted, a separate consumable electrode supported by each of said carriages and means for moving said carriages under the control of the said single controller.

7. Electroslag apparatus as claimed in claim 6, and wherein the said individual carriages are each moved up and down the said columns by individual motor driven hoists, and a sequence switching means for controlling each of said individual hoists in sequence by said single controller.

8. Electroslag apparatus as claimed in claim 1, and wherein said electrical conductors connect the said consumable electrodes to a single phase supply and wherein said sensing and monitoring means comprises a current reference transformer positioned adjacent the electrical conductor of at least one of said electrodes.

9. Electroslag apparatus as claimed in claim 1, and wherein said electrical conductors connect the said consumable electrodes to the respective phases of a multiphase supply and wherein said sensing and monitoring means comprises a current reference transformer positioned adjacent at least one of said conductors.

10. Electroslag apparatus as claimed in claim 1, and wherein each of the several consumable electrodes has its lower end extending into a slag blanket contained within a single mould, whereby a single ingot is produced by the contemporaneous melting of the consumable electrodes.

11. Electroslag apparatus as claimed in claim 1, and including a plurality of ingot moulds, each of said moulds containing a slag blanket and wherein each individual consumable electrode lower end extends into a separate one of said slag blankets, whereby a plurality of individual ingots are produced by the contemporaneous melting of each of the said consumable electrodes.